(12) United States Patent
Kukkonen

(10) Patent No.: US 12,397,770 B2
(45) Date of Patent: Aug. 26, 2025

(54) METHOD FOR CONTROLLING POWERTRAIN, AND POWERTRAIN

(71) Applicant: NORMET OY, Iisalmi (FI)

(72) Inventor: Samu Kukkonen, Iisalmi (FI)

(73) Assignee: NORMET OY, Iisalmi (FI)

( * ) Notice: Subject to any disclaimer, the term of this patent is extended or adjusted under 35 U.S.C. 154(b) by 331 days.

(21) Appl. No.: 17/922,704

(22) PCT Filed: May 17, 2021

(86) PCT No.: PCT/FI2021/050356
§ 371 (c)(1),
(2) Date: Nov. 1, 2022

(87) PCT Pub. No.: WO2021/234221
PCT Pub. Date: Nov. 25, 2021

(65) Prior Publication Data
US 2023/0211768 A1    Jul. 6, 2023

(30) Foreign Application Priority Data
May 20, 2020 (FI) .................................. 20205514

(51) Int. Cl.
*B60W 10/06* (2006.01)
*B60K 6/46* (2007.10)
(Continued)

(52) U.S. Cl.
CPC .............. *B60W 10/06* (2013.01); *B60K 6/46* (2013.01); *B60L 15/2009* (2013.01);
(Continued)

(58) Field of Classification Search
CPC ...... B60W 10/06; B60W 10/08; B60W 10/18; B60W 10/26; B60W 20/16; B60W 30/18127; B60W 30/18136; B60W 2552/15; B60W 2300/125; B60W 2510/0638; B60W 2710/0627;
(Continued)

(56) References Cited

U.S. PATENT DOCUMENTS

2006/0069487 A1*  3/2006  Sychra ................ B60W 10/184
                                                    701/69
2010/0305821 A1   12/2010  Huseman
(Continued)

OTHER PUBLICATIONS

International Status Report and Written Opinion in International Application No. PCT/FI2021/050356, mailed Aug. 9, 2021, 9 pages.
(Continued)

Primary Examiner — Edwin A Young
(74) Attorney, Agent, or Firm — Meunier Carlin & Curfman LLC

(57) ABSTRACT

Method for controlling a powertrain of a vehicle and a powertrain, which powertrain comprises a diesel engine, an electric generator, a generator drive, at least one electric motor, at least one electric motor drive, operator input de-vices, and a control system, wherein the control system controls at least some of the parts of the powertrain based on information obtained from the operator input devices and at least one measuring signal obtained from the diesel engine, from the generator drive, and from the at least one electric motor drive.

10 Claims, 3 Drawing Sheets

(51) Int. Cl.
*B60L 15/20* (2006.01)
*B60L 50/15* (2019.01)
*B60W 10/08* (2006.01)
*B60W 10/18* (2012.01)
*B60W 10/26* (2006.01)
*B60W 20/16* (2016.01)
*B60W 30/18* (2012.01)

(52) U.S. Cl.
CPC ............ *B60L 50/15* (2019.02); *B60W 10/08* (2013.01); *B60W 10/18* (2013.01); *B60W 10/26* (2013.01); *B60W 20/16* (2016.01); *B60W 30/18127* (2013.01); *B60W 30/18136* (2013.01); *B60L 2240/421* (2013.01); *B60L 2240/441* (2013.01); *B60L 2240/443* (2013.01); *B60W 2300/125* (2013.01); *B60W 2510/0638* (2013.01); *B60W 2552/15* (2020.02); *B60W 2710/0627* (2013.01)

(58) Field of Classification Search
CPC ................ B60L 50/15; B60L 15/2009; B60L 2240/421; B60L 2240/441; B60L 2240/443; B60K 6/46
See application file for complete search history.

(56) References Cited

U.S. PATENT DOCUMENTS

| | | |
|---|---|---|
| 2012/0283921 A1 | 11/2012 | Wilmanowicz et al. |
| 2015/0251648 A1 | 9/2015 | Okada et al. |
| 2016/0052510 A1* | 2/2016 | Aldrich, III .... B60W 30/18063 180/65.265 |
| 2018/0065621 A1 | 3/2018 | Merkle et al. |
| 2019/0256078 A1 | 8/2019 | Lavertu |
| 2019/0389468 A1 | 12/2019 | Fritz et al. |

OTHER PUBLICATIONS

Finnish Search Report in Finnish Application No. 20205514, dated Dec. 14, 2020, 1 page.
Office action issued in corresponding Finnish application 20205514; dated on Oct. 5, 2023, 8 pages.

* cited by examiner

METHOD FOR CONTROLLING POWERTRAIN, AND POWERTRAIN

CROSS REFERENCE TO RELATED APPLICATIONS

This application is a United States National Phase Patent Application of International Patent Application Number PCT/FI2021/050356, filed on May 17, 2021, which claims the benefit of priority to FI application No. 20205514, filed May 20, 2020.

TECHNICAL FIELD OF THE INVENTION

The present invention relates to the controlling of a diesel-electric or hybrid powertrain of a mobile machine, such as mobile mining machinery for example. More precisely the invention relates to such a method and to a diesel-electric or hybrid powertrain utilizing the method.

BACKGROUND OF THE INVENTION

A diesel-electric powertrain or driveline is used in variety of different kinds vehicles for providing the movement of the vehicle. A diesel-electric powertrain, or diesel-electric driveline, system comprises a diesel engine connected to an electrical generator providing electricity for electric motors providing the propulsive power for the vehicle, as well as the related drives for the generator and the electric motors. The diesel-electric powertrains are typically used in diesel-electric railway locomotives and ships, for example.

Implementing diesel-electric powertrain for mobile machinery provides significant advantages, such as enabling mechanical layout rearrangement of the machine for increased load capacity or decreased size of the machine or better mechanical stability. Additionally, improved controllability of the torque and power output as well as greater efficiency can also be obtained. Demanding and continuously changing working environments, such as in mining and tunneling, however, provide challenges for implementing the diesel-electric powertrain in the machines operating in such environments.

When an energy storage, such as a suitable battery, is added in the diesel-electric powertrain, the diesel-electric powertrain changes to a hybrid powertrain.

SUMMARY

The present invention provides a novel method and apparatus for controlling a diesel-electric or hybrid powertrain, especially in demanding operating conditions, such as in mining and/or tunnelling work for example. The present invention is especially applicable for vehicles and machines that typically need to travel long continuously ascending and/or descending distances.

With the present invention it is possible to control the diesel-electric or hybrid powertrain by controlling the speed of the vehicle, power balance between the diesel-generator power production or consumption (in braking situation) and the electric motors' power consumption or production (in braking situation), together with the braking operation including a diesel engine brake system. This allows optimization of the diesel engine operation in the electrical power generation as well as use of the engine brake system for creating braking power for the whole vehicle. Further, in situations where the engine brake system is not sufficient to decrease the speed of the machine or keep the speed constant, additional steps can be implemented for increasing the braking power, such as activating auxiliary loads, activating axle brakes, and/or adjust the speed of the vehicle to more properly match with the braking power obtained with the engine brake, for example.

In the present invention a control system controlling the diesel-electric or hybrid powertrain receives inputs from the operator of the vehicle in a form of reference values, which can be a request for specific torque, speed or power for moving the vehicle. Additional inputs to the control system may include driving direction, speed range, ECO/POWER requests to alter the dynamic response of the powertrain, and/or brake pedal actuation signal, for example. These operator inputs originate from operator input devices, such as from a gas pedal of the vehicle for example. In addition to these reference values from the operator, the control system receives information from at least one part of the powertrain, the part being the diesel engine, the generator drive and/or the at least one electric motor drive of the powertrain, and the information being a measurement signal or signals.

Based on the operator inputs and measurement information from the powertrain, the control system fulfills the operator request by controlling the different parts of the powertrain. This includes setting reference values to at least one electric motor drive to fulfill the request and controlling diesel engine, generator drive and/or engine brake system to provide or consume the required power. Additional controls such as enabling auxiliary loads, axle brakes and/or reducing the speed of the vehicle can be applied also.

In order to fulfil the operator input reference values, the control system continuously follows the operation of the powertrain based on the measurement information from the parts of the powertrain, and controls the powertrain accordingly to continuously provide or consume sufficient electrical power for the at least one electrical motor drive. Due to the measurement signals obtained from the parts of the powertrain, especially from the at least one electrical motor drive, the control system can also fulfill the operator input reference values during movement of the vehicle, even in a demanding and changing environment, without required operator adjustments. The operator can, of course, input new reference values at any time, such as decreased speed for example, if and when deemed necessary.

The diesel engine preferably comprises an electronic control unit (ECU) which controls the operation of the diesel engine. The ECU and/or the generator drive, in addition to their other functions, comprise limit value or values, such as limit value for the maximum rotational speed, power production and/or torque of the diesel engine for example, for protecting the diesel engine. This limit value or values can be preset fixed values or it/those can be changed at any situation by the control system.

In the present invention the electrical power generated by the generator is preferably conveyed directly to the at least one electric motor drive driving an electric motor operating traction means of the vehicle, which allows the electrical power also to be conveyed in the opposite direction, i.e. from the at least one electric motor drive to the generator. In this situation the generator starts to operate as an electric motor and starts to drive the diesel engine, which causes the rotational speed of the diesel engine to increase, since the rotor of the generator is directly coupled to the output shaft of the diesel engine. The engine brake system of the diesel engine can then be utilized to provide additional braking torque and/or power if cutting fuel injection does not provide sufficient braking power. This way the engine brake system can also be utilized in the present invention for braking of the whole vehicle or maintaining the speed of the vehicle in downhill driving, especially when the vehicle is travelling long descending paths which are typical in mines and mining tunnels, for example. This engine braking system thus also decreases the need to use friction brakes on the axels. If the engine brake system does not provide enough braking power, the control system can also apply additional functions, such as activate auxiliary loads, activate axle brakes, or decrease the speed of the vehicle to more properly match the capabilities of the engine brake system.

In the context of the present invention the engine braking system is mechanically integrated to the engine, which engine braking system may utilize one or more different engine braking methods, such as cutting fuel injection, compression release engine brake, and/or exhaust braking system, for example. These engine braking methods are controlled in the engine braking system preferably by the electronic control unit (ECU) of the diesel engine.

The present invention also allows a solution for one key problem with diesel-electric powertrains. The diesel engine power and/or torque output capability decreases over time as the diesel engine ages and/or get damaged during use of the machine, or the decrease may be caused by the ECU running the diesel engine at limited power due to some error. This decrease in diesel engine power/torque decreases electrical power generation capability of the powertrain. As a result, the operation of the powertrain needs to be adjusted. The control system of the present invention can be configured to take this power decrease into account in controlling the powertrain by utilizing the at least one measurement signal from the powertrain together with algorithms, virtual diesel engine models, machine learning and/or similar means to estimate the amount of the power decrease.

In the method of the invention controlling a powertrain of a vehicle, which powertrain comprises a diesel engine, an electric generator, a generator drive, at least one electric motor, at least one electric motor drive, operator input devices, and a control system, the control system controls at least some of the parts of the powertrain based on information obtained from the operator input devices and at least one measuring signal obtained from the diesel engine, from the generator drive, and from the at least one electric motor drive.

In an embodiment of the method of the invention the parts of the powertrain that the control system controls include the diesel engine, the generator drive and/or the at least one electric motor drive of the powertrain. In this embodiment the control system controls the diesel engine preferably via an electronic control unit (ECU) of the diesel engine and via the ECU an engine brake system of the diesel engine.

In an embodiment of the method of the invention the at least one measuring signal defines the rotational speed of the diesel engine, the rotational speed of the generator, the electrical power generation of the generator, and the electrical power consumption of the at least one electrical motor drive.

In the above embodiments the control system preferably activates the engine brake system of the diesel engine when the control system receives measuring signal indicating increase in the diesel engine's rotational speed over a predefined activation threshold value without corresponding change input from the operator input devices. Alternatively the engine brake system can be activated based on measurement of the power production of the at least one electric motor, or based on the measurement of both the power production of the at least one electric motor and the rotational speed of the diesel engine, for example.

The control system may also activate axle brakes, apply auxiliary loads and/or reduce the machine speed when the engine brake system is activated.

In an embodiment of the method of the invention the electrical power from the generator is conveyed directly from the generator drive to the at least one electric motor drive. In this embodiment the powertrain may also comprise an energy storage, to which excess electrical power from the generator is conveyed and from which additional electrical power can be conveyed to the at least one electric motor drive. Further, the braking power from the at least one electric motor drive can be stored in the energy storage for later use.

In an embodiment of the method of the invention the operator input devices allow operator selection from a plurality of predefined settings of the powertrain operating parameters. In this embodiment the control system will carry out the control actions within these operating parameters selected by the operator.

The present invention also provides a powertrain, which comprises a diesel engine, an electric generator, a generator drive, at least one electric motor, an electric motor drive for each electric motor, operator input devices, and a control system for controlling an operation of the diesel engine, the generator, and the at least one electric motor, wherein the control system is configured to control the operation of at least one of the diesel engine, the generator, and at least one electric motor based on at least one received measuring signal, which measuring signal defines rotational speed of the diesel engine, measured power of the at least one electric motor, and the rotational speed and torque of the at least one electric motor.

In an embodiment of the powertrain of the invention the diesel engine comprises an engine brake system. The engine brake system preferably comprises at least an electronic control unit of the diesel engine controlling the diesel engine in accordance with a suitable engine braking method, and optionally also a compression release engine brake and/or an exhaust brake.

In an embodiment of the powertrain of the invention the generator drive is electrically directly connected to the electric motor drive. In this embodiment the powertrain may preferably comprise an energy storage, which energy storage in connected between the generator drive and the electric motor drive and in parallel connection with the direct electrical connection between the generator drive and the electric motor drive. The direct electrical connection means that the power can flow only between the generator drive and the motor drive(s), and it may comprise fuses, contactors, etc.

In the above embodiments the control system is preferably configured to apply engine brake system via the electronic control unit of the diesel engine when the at least one measuring signal indicates increase in the diesel engine's rotational speed over predefined activation threshold value.

The powertrain may also comprise an energy storage, which energy storage is connected between the generator drive and the electric motor drive and in parallel connection with the electrical direct connection between the generator drive and the electric motor drive.

The present invention also provides a mining or tunneling vehicle comprising the powertrain of the invention, and a computer program configured to perform the method of the invention when run in a computer. The computer program may also be on a tangible, non-volatile computer-readable storage medium.

More precisely the features defining a method of the present invention are presented in claim 1, and the features defining a powertrain of the invention are more precisely presented in claim 9. Dependent claims present advantageous features and embodiments of the invention.

BRIEF DESCRIPTION OF THE FIGURES

The exemplary embodiments of the invention are explained with reference to the accompanying figures, where.

DETAILED DESCRIPTION OF THE FIGURES

Figure 1:
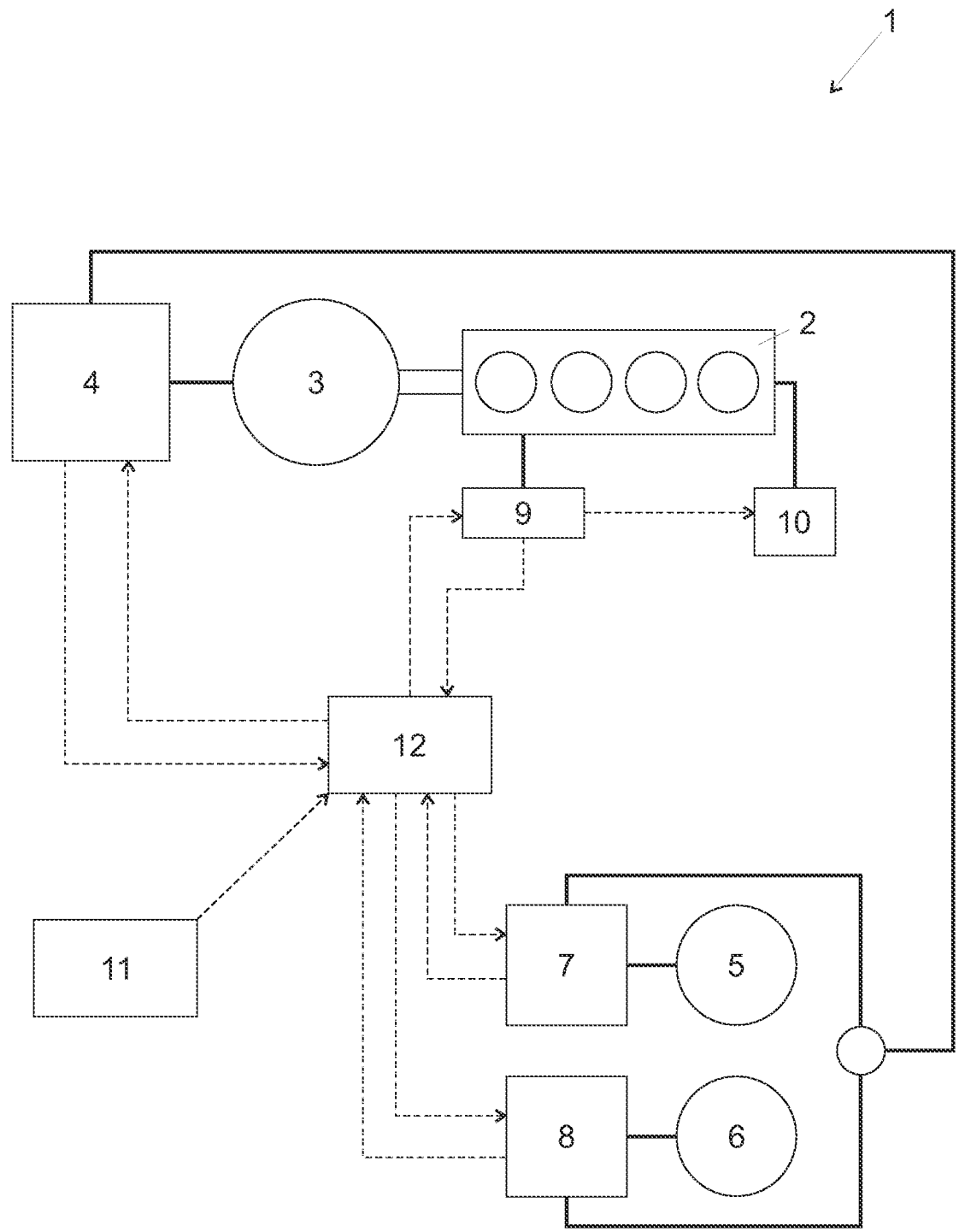
FIG. 1 shows schematically an embodiment of a powertrain of the invention.

In FIG. 1 is shown schematically the main parts of an embodiment of a diesel-electric or hybrid powertrain 1 in accordance with the present invention.

The powertrain 1 comprises a diesel engine 2, which rotates a generator 3 for creating electricity. To the generator 3 is connected a generator drive 4. The generator drive 4 controls the generator 3 for obtaining the required electrical current and voltage from the generator, and provides the operating electrical power for a front electric motor 5 and a rear electric motor 6 of the vehicle and the respective drives 7 and 8 controlling these motors. The motors 5 and 6 rotate traction members of the vehicle, such as tires (not shown), for example.

The diesel engine 2 is equipped with an electric control unit (ECU) 9 and an integrated engine brake system comprising an exhaust brake 10. The ECU 9 controls both the diesel engine 2 and the engine brake system comprising the exhaust brake 10. In addition to the exhaust brake 10, or alternatively, the engine brake system may comprise a compression release brake or some other form of a brake.

The powertrain 1 also comprises a control system 12 controlling the operation of the powertrain based on the instruction received from operator input devices 11, such as gas and brake pedals, for example. The instructions received from the operator input devices 11 are in form of signals representing reference values, such as speed, torque and/or power for example.

In the embodiment of FIG. 1 the control system 12 controls the generator drive 4, the ECU 9 of the diesel engine 2, as well as the drives 7 and 8 of the electric motors 5 and 6. Additionally the control system 12 may also control auxiliary loads and/or axle brakes.

The generator drive 4 provides information of the generator's 3 rotational speed and/or the electrical power produced by the generator to the control system 12.

The ECU 9 provides information of the diesel engine's 2 rotational speed to the control system 12, in addition to other required information such as load information, etc.

The electric motor drives 7 and 8 provide information of the electric motor's 5 and 6 rotational speed and torque, and/or the actual electrical power used by the electric motors 5 and 6 to the control system 12.

Figure 2:
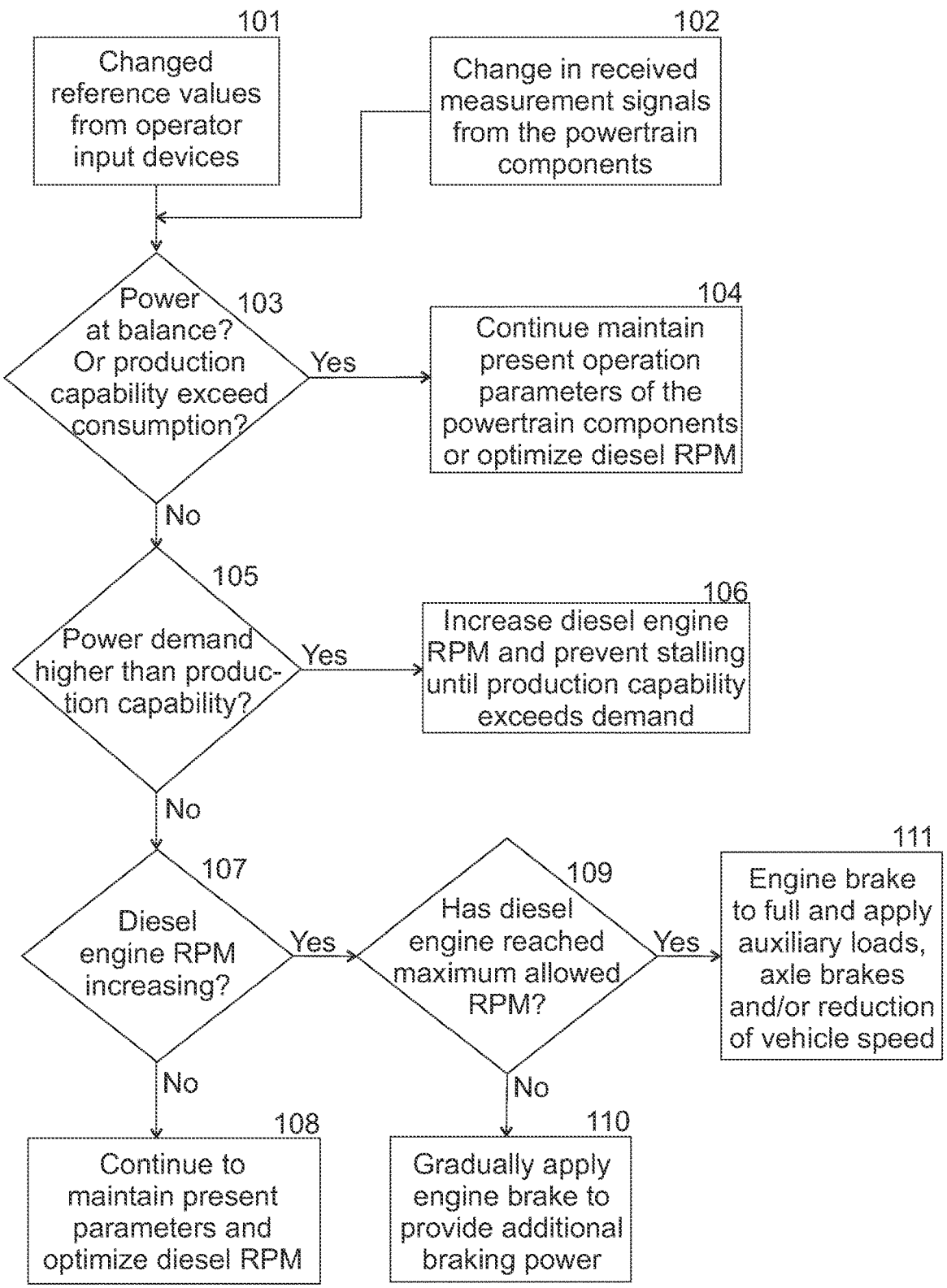
FIG. 2 shows a functional diagram of an embodiment of the control operations of the invention.

Based on the information received from the generator drive 4, the ECU 9, the electric motor drives 7 and 8, as well as from the operator input devices, the control system 12 controls the powertrain in a way discussed in following with reference to FIG. 2.

FIG. 2 shows a functional diagram of an embodiment of the operations of the controlling of the powertrain in accordance with the invention, such as shown in FIG. 1, for example.

In the normal operation of the powertrain 1, the control system 12 controls the powertrain with speed, power and/or torque requests to the electric motor drives 7 and/or 8 to maintain the present operating parameters. The electric motor drives 7 and 8 control the electric motors 5 and 6 to fulfil the requests from the control system 12 within external or internal limit values to move the vehicle.

Changes in the control operations of the powertrain 1 are initiated either by the operator of the vehicle equipped with the powertrain via operator input devices 11, as shown in box 101, or by change in the measurement signals received by the control system 12 from the components of the powertrain, such as electric motor drives 7 and/or 8, for example, as shown in box 102.

Operator initiated change via the operator input devices 11 sets a new reference values for the control system 12, based on which the control system starts to control the powertrain 1 for obtaining these. The change in the received measurement signal or signals typically originate from changed environmental factors, such as from a change in degree of a decline or ascent in the travel path of the vehicle, for example.

After being notified or indicated of a change in the operating parameters of the powertrain 1, the control system 12 checks whether the present power consumption and power production capability of the powertrain 1 are at balance, as shown in box 103. If there is balance, i.e. sufficient additional power production is available with the present operating parameters of the powertrain 1 for implementing the change, then the present operating parameters of the powertrain and its components are maintained as shown in box 104, and the required additional power is produced by the generator 3 and provided for the electric motor drives 7 and 8.

In case the change requires less power for the electric motors drives 7 and 8, the control system 12 simultaneously checks whether the present power production capability exceeds the required power consumption, as also shown in box 103. In case the present power production capability does greatly exceed the required power consumption, the control system 12 proceeds also to optimize the rotational speed of the diesel engine 2, as also shown in box 104, in order to save fuel and lower the engine noise and exhaust gas created, for example.

If the power consumption and the power production capability in the powertrain 1 is not in balance, and the power production capability does not exceed the power demand, the control system 12 checks whether the power demand required for implementing the change is higher than present power production capability, as shown in box 105.

If the power demand for implementing the change is higher than the present power production capability, the control system 12 proceeds to increase the rotational speed on the diesel engine 2 for providing more electrical power production capacity for the powertrain 1 and at the same time limits the power consumption of the electrical motor drives 7 and 8 so that the diesel engine does not stall, until the power production capability of the powertrain exceeds the new higher power demand, as shown in box 106.

If the power demand of the change is not higher than the present power production capability of the powertrain 1, the control system checks whether the rotational speed of the diesel engine 2 is increasing, as shown in box 107.

If there is no increase in the rotational speed of the diesel engine 2, the control system 12 continues to maintain the present operating parameters of the powertrain 1 and its components, and also optimize the rotational speed of the diesel engine 2, as shown in box 108. The optimization of the rotational speed of the diesel engine 2 may comprise optimization of fuel consumption, noise level, after-treatment system, and/or responsiveness, for example. In case of fuel consumption optimization, the control system 12 adjusts the rotational speed of the diesel engine 2 to find optimum fuel consumption point while also maintaining the required power production capability and responsiveness.

If the rotational speed of the diesel engine 2 is increasing, the control system 12 checks whether the rotational speed of the diesel engine has reached its allowed maximum value, as shown in box 109.

If the maximum value of the rotational speed of the diesel engine 2 is not reached, the control system 12 starts to apply engine braking system of the diesel engine by controlling the ECU 9 of the diesel engine to control the diesel engine in accordance with a suitable engine braking method, and via the ECU the engine brake system, in order to provide additional braking power for the vehicle, as shown in box 110. This signifies the situation where the vehicle is travelling in descending slope, or deacceleration of the machine is requested by the operator, and the electric motors 5 and 6 start to act as generators and provide electrical power in the powertrain 1.

If the rotational speed of the diesel engine 2 has reached the allowed maximum value, then the control system 12 applies the engine braking system fully via the ECU 9, and also starts to apply additional braking means such as applying auxiliary loads, applying axle brakes of the vehicle and/or reduce the present speed parameters of the vehicle. In this situation the vehicle is travelling in a continuous descending slope in which its speed and momentum are exceeding, or at risk of exceeding, the input reference values, and the control system 12 applies all required means to stop the speed increase and get the vehicle speed back within acceptable parameters under those conditions.

In the present invention the operator input devices 11 can include means or device, such as a suitable selecting device, for the operator to select between a plurality of preset operating parameters of the powertrain. This selecting device corresponds substantially to a gearbox lever of a traditional powertrain. If, for example, the preset maximum rotational speed for the diesel engine 2 is 2000 RPM, then the predetermined operating parameters for the powertrain 1 can, for example, be the following:

Level 1: Diesel engine's rotational speed is 1000 RPM, whereby allowed vehicle speed 0-7 km/h and electrical power max. 100 kW.

Level 2: Diesel engine's rotational speed is 1250 RPM, whereby allowed vehicle speed 0-14 km/h and electrical power max. 150 kW.

Level 3: Diesel engine's rotational speed is 1500 RPM, whereby allowed vehicle speed 0-21 km/h and electrical power max. 220 kW.

The above levels allow gear-like controlling the powertrain 1 via the control system 12 based on the selected level from the operator input devices 11.

Alternatively, or additionally, the control system 12 can control the rotational speed of the diesel engine 2 stepwise for example in the following way based on the actual measured electrical power from the electrical motor drives 7 and 8:

When the measured power consumption is under 65 kW, the rotational speed is kept at 1000 RPM.

When the measured power consumption is between 65 kW and 130 kW, the rotational speed is raised to 1400 RPM.

When the measured power consumption is above 130 kW, the rotational speed is raised to 1800 RPM.

In this embodiment the changing of the rotational speed of the diesel engine 2 up is implemented preferably when the measured power exceeds the set maximum electrical power for 0.5 seconds. The change of rotational speed down is preferably implemented when the measured power is below the lower limit for 5 seconds.

Figure 3:
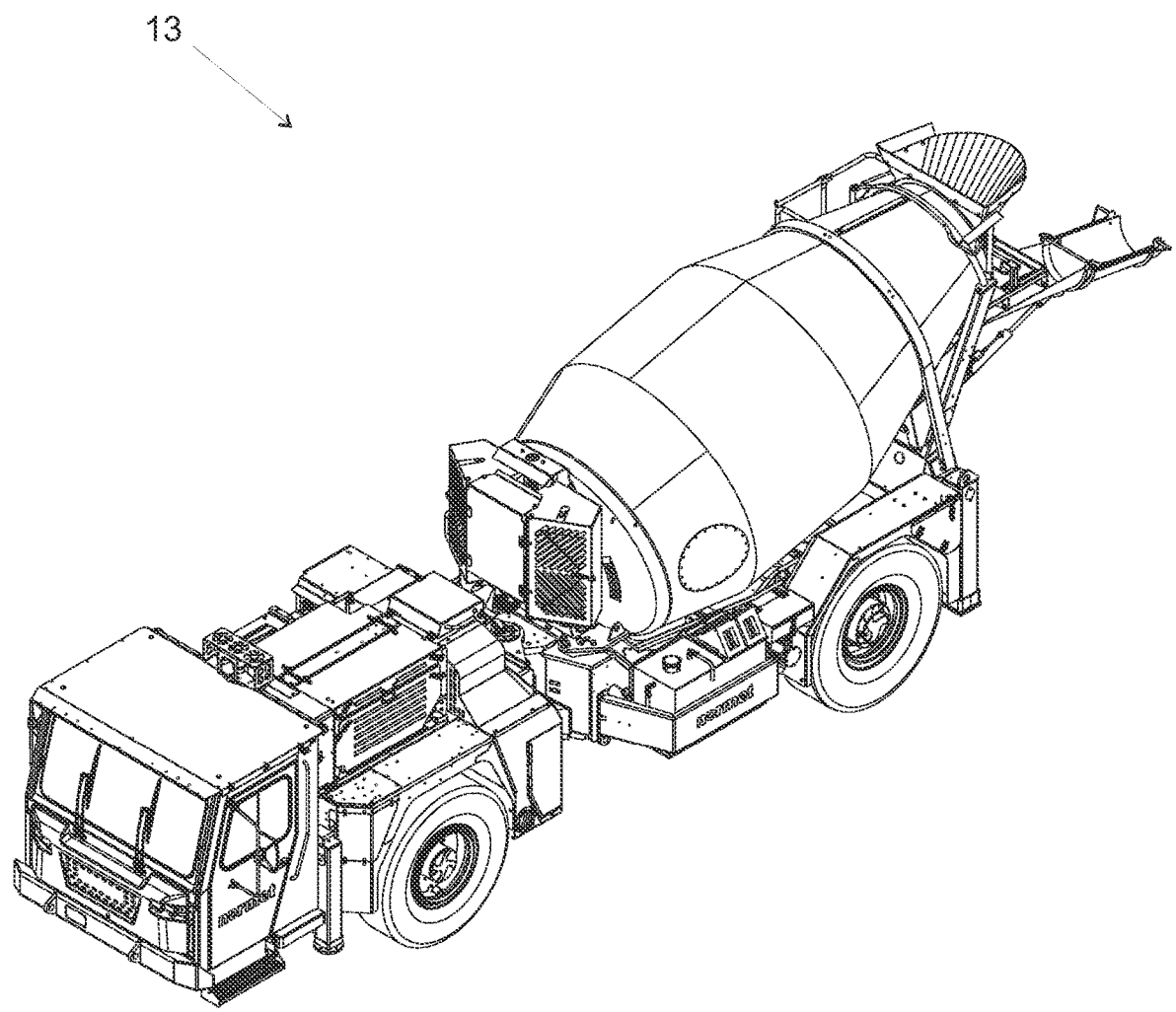
FIG. 3 shows schematically an embodiment of a vehicle for a powertrain of the invention.

FIG. 3 shows an embodiment of a vehicle 13 utilizing a powertrain of the invention. In this embodiment the vehicle is an agitator. Other suitable mining and tunneling vehicles include concrete spraying equipment, charging equipment, scaling equipment, underground logistics equipment, and lifting and installation equipment, for example. Especially suitable the powertrain of the invention is for equipment that are typically driven substantial amounts, such as the logistics equipment for example.

The invention has been explained above with reference to the above-mentioned exemplary embodiment and its several advantages have been demonstrated. It is clear that the invention is not only restricted to this embodiment, but it comprises all possible embodiments within the scope of the following claims.

The invention claimed is:

1. A method for controlling a powertrain of a vehicle, the method comprising:
   providing a powertrain comprising a diesel engine, an electric generator, a generator drive, at least one electric motor, at least one electric motor drive, operator input devices, and a control system;
   controlling, via the control system at least some of the parts of the powertrain based on information obtained from the operator input devices and at least one measuring signal obtained from the diesel engine, from the generator drive, and from the at least one electric motor drive;
   controlling, via the control system, the diesel engine, the generator drive and/or the at least one electric motor drive of the powertrain, and wherein the control system controls the diesel engine via an electronic control unit of the diesel engine and via the electronic control unit an engine brake system of the diesel engine; and
   activating, via the control system, the engine brake system of the diesel engine when the control system receives a measuring signal indicating increase in the diesel engine's RPM over a predefined activation threshold value without a corresponding change input from the operator input devices.

2. The method of claim 1, wherein the at least one measuring signal defines a rotational speed of the diesel engine, a rotational speed of the generator, electrical power generation of the generator, and electrical power consumption of the at least one electrical motor drive.

3. The method of claim 1, wherein the control system is further configured to activate axle brakes, apply auxiliary loads and/or reduce the vehicle speed.

4. The method of claim 1, further comprising conveying electrical power from the generator directly from the generator drive to the at least one electric motor drive.

5. The method of claim 4, further comprising conveying excess electrical power from the generator to an energy storage, and conveying additional electrical power from the energy storage to the at least one electric motor drive.

6. The method of claim 1, wherein the operator input devices allow operator selection from a plurality of predefined settings of powertrain operating parameters.

7. A powertrain comprising
a diesel engine,
an electric generator,
a generator drive,
at least one electric motor,
an electric motor drive for each electric motor,
operator input devices, and
a control system for controlling an operation of the diesel engine, the generator, and the at least one electric motor, wherein
the control system is configured to control the operation of at least one of the diesel engine, the generator, and the at least one electric motor based on at least one received measuring signal, which measuring signal defines rotational speed of the diesel engine, measured power of the at least one electric motor, and rotational speed and torque of the at least one electric motor,
wherein the diesel engine comprises an electronic control unit and an engine brake system, the engine brake system comprising an exhaust brake and/or compression release engine brake, and
wherein the control system is configured to apply the engine brake system via the electronic control unit of the diesel engine when the at least one measuring signal indicates increase in the diesel engine's rotational speed over a predefined activation threshold value.

8. The powertrain of claim 7, wherein the generator drive is electrically directly connected to the electric motor drive.

9. The powertrain of claim 7, wherein the generator drive is electrically directly connected to the electric motor drive, wherein the powertrain comprises an energy storage, which energy storage is connected between the generator drive and the electric motor drive and in parallel connection with the electrical direct connection between the generator drive and the electric motor drive.

10. A mining or tunnelling vehicle comprising the powertrain according to claim 7.

* * * * *